United States Patent [19]

Niggeloh

[11] 4,075,642

[45] Feb. 21, 1978

[54] PHOTOGRAPHIC IMPLEMENT

[76] Inventor: Fritz Niggeloh, Fichtenhof, 5608 Radevormwald, Germany

[21] Appl. No.: 603,199

[22] Filed: Aug. 8, 1975

[30] Foreign Application Priority Data

| | | |
|---|---|---|
| Aug. 8, 1974 | Germany | 2438110 |
| Nov. 2, 1974 | Germany | 2452043 |

[51] Int. Cl.[2] .......... G03B 17/00

[52] U.S. Cl. .......... 354/82; 354/293

[58] Field of Search .......... 354/81, 82, 288, 293, 354/199, 202, 219; 352/242, 243; 150/52 J; 224/5 V

[56] References Cited

U.S. PATENT DOCUMENTS

| | | | |
|---|---|---|---|
| 2,445,036 | 7/1948 | Prentice | 354/288 |
| 2,638,041 | 5/1953 | Horydczak | 224/5 V |
| 2,681,600 | 6/1954 | Heidecke | 354/288 |
| 3,240,143 | 3/1966 | Koeber et al. | 352/243 |
| 3,263,588 | 8/1966 | Robinson | 354/76 |
| 3,380,366 | 4/1968 | Olson | 352/243 |
| 3,588,239 | 6/1971 | Hochstein et al. | 352/243 |
| 3,592,117 | 7/1971 | Fukuda | 354/82 |
| 3,597,068 | 8/1971 | Masuyama et al. | 352/243 |
| 3,599,553 | 8/1971 | Hansen | 352/242 X |
| 3,774,519 | 11/1973 | Johnson | 354/293 |
| 3,835,905 | 9/1974 | Spruyt | 150/52 J |
| 3,881,678 | 5/1975 | Quinn | 354/126 |
| 3,938,166 | 2/1976 | Sloop | 224/5 V |

*Primary Examiner*—L. T. Hix
*Assistant Examiner*—Alan Mathews
*Attorney, Agent, or Firm*—Montague & Ross

[57] ABSTRACT

A protective case for a pocket camera is positionable generally transversely to the camera body to serve as a handle therefor in an operating position. Upon swinging into a nonoperating position, the case obstructs an objective and a viewfinder of the camera.

13 Claims, 6 Drawing Figures

C 210b' 27 25 26 15 17 210c' 13 210c 210 18 18 210d' 210a 214 210d 210d 210b

C
210b'
27
25
26
15
210c'
13
210c
210
17
18
18
210d'
210a
214
210d
210d
210b 113b
27
113
113a
A
19
310
20
D
310a
21
20
25
22
21
314
310e
29
310d

PHOTOGRAPHIC IMPLEMENT

FIELD OF THE INVENTION

My present invention relates to a photographic implement consisting essentially of a small camera with a flat, generally prismatic body, referred to in the trade as a pocket camera, and a protective case therefor.

BACKGROUND OF THE INVENTION

Such cameras have the advantage of low weight and small volume, being therefore easily carried on the person of the user. In operation, however, they are somewhat unsteady because of the absence of any appendages which the user could firmly grip with one hand while taking a picture with the other hand. Providing such an appendage on the camera body would, of course, defeat the very idea of making the camera compact enough to fit into one's coat pocket or pocketbook.

OBJECT OF THE INVENTION

The object of my present invention, therefore, is to design a photographic implement of this character in such a way as to provide at least a temporary handle which, without adding to the bulk of the camera body, can be used for holding the camera steady during its operation.

SUMMARY OF THE INVENTION

I realize this object, in accordance with the present invention, by the provision of a protective case which surrounds the camera body in a nonoperating position and which extends generally transversely to that body in an operating position to form a supporting handle.

The protective case may be pivoted to the camera body, or to a heel bracketing an end thereof, for relative movement with a simple swinging or composite translatory and rotational motion to place the camera body the handle member in the nonoperating position, thereby minimizing the overall volume of the implement. With the handle member between a pair of spaced-apart cheek plates in the nonoperating position, the aforedescribed composite motion may allow an endwise insertion of the camera body into the case to establish that nonoperating position.

Advantageously, pursuant to another feature of my invention, the case is provided at least on its surface with a nonmetallic anit-slippage material such as leather, plastic or textile fabric which allows the handle to be firmly gripped and is also pleasant to the touch. A layer of such anti-slippage material may form part of a flexible sheath on a relatively rigid core of sheet metal, cardboard, hard plastic or the like.

BRIEF DESCRIPTION OF THE DRAWING

The above and other features of my invention will now be described in detail with reference to the accompanying drawing in which.

SPECIFIC DESCRIPTION

Figure 1:
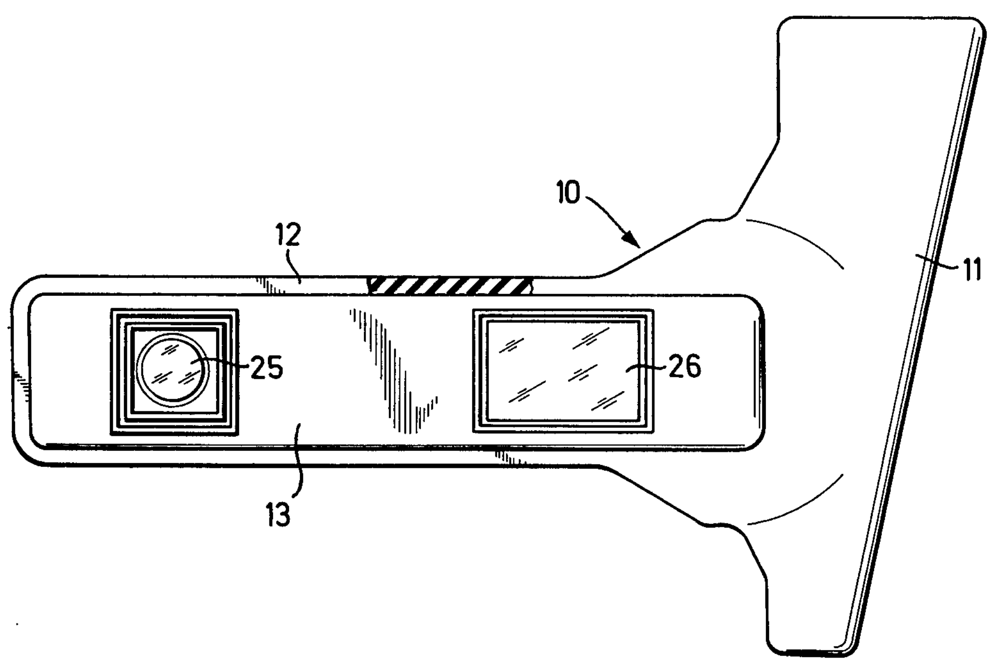
FIG. 1 is a front view of a photographic implement with a detachable handle.

In FIG. 1 I have shown a conventional pocket camera 13 whose flat prismatic body is girdled under tension by an elastic band 12 constituting a body-engaging portion of a protective case 10. A member 11 integral with band 12 extends generally transversely to the camera body 13 to serve as a handle during picture taking. The band 12 leaves free an objective 25 and a viewfinder 26 on the front side as well as the usual shutter-release button and eyepiece (not shown) on the rear side of body 13.

Figure 2:
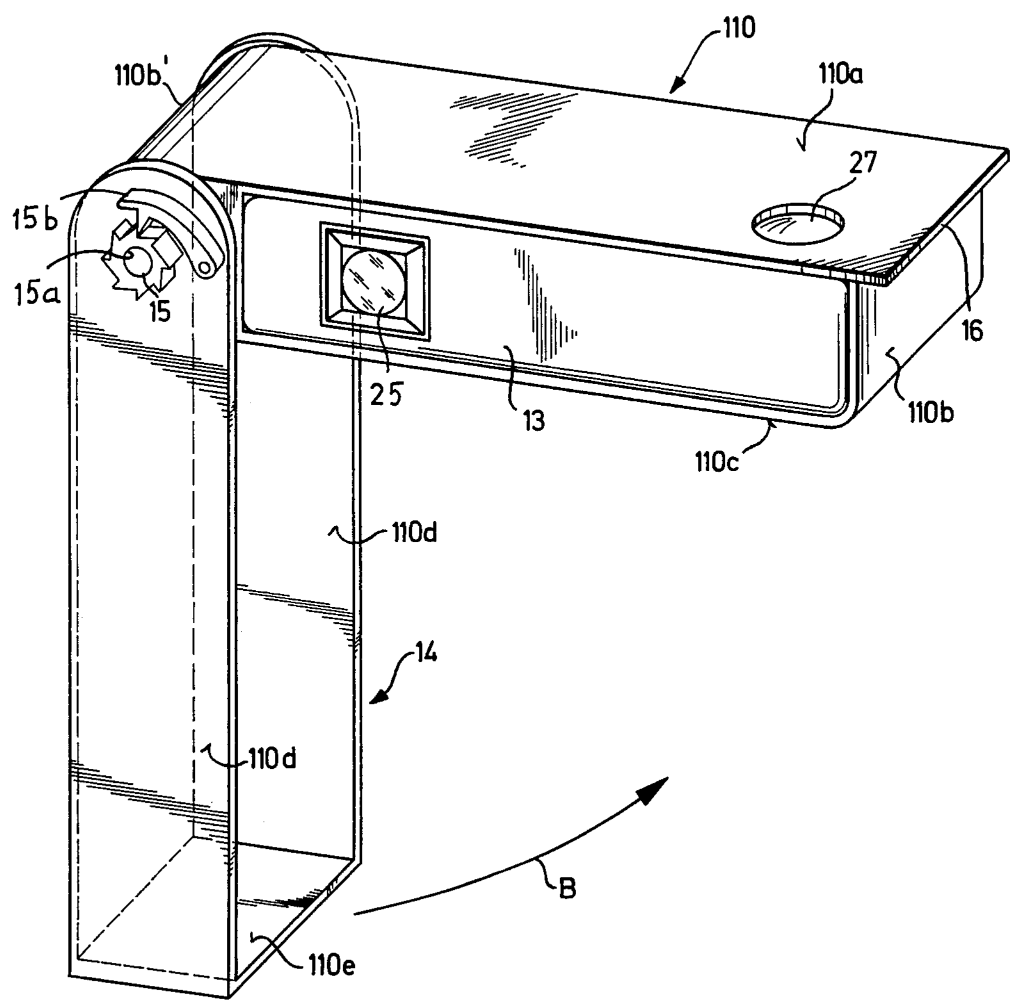
FIG. 2 is a perspective view of an implement representing an embodiment of my invention.

FIG. 2 shows the camera body 13 engaged by a frame portion 110 of a protective case having top and bottom walls **110*a*, 110*c*, an end wall 110*b* and a hub 110*b'*. A yoke-shaped handle member 14 has a pair of parallel cheek plates 110*d* and a bight 110*e* remote from hub 110*b'*; the cheeks are articulated to the hub by a pair of studs 15 (only one shown) enabling the member 14 to be swung through an arc of 90°, as indicated by an arrow B, from its illustrated transverse position (allowing the camera to be operated) to an alternate position alongside the camera body 13 in which operation is prevented since the objective 25 is obstructed by one of the cheek plates 110*d*. In that nonoperating position the bight 110*e* abuts an extremity 16 of top wall 110*a* overhanging the end wall 110*b* of the body-engaging case portion. Top wall 110*a* has a hole 27 enabling observation of the film position in the camera; such a hole could also serve as an access opening to the shutter-release button if the latter were disposed at the top of the body 13** rather than at its rear as mentioned above.

In order to arrest the relatively swingable parts 110 and 14 in the illustrated operating position, at least one pivot stud 15 carries a ratchet **15*a* coacting with a pawl 15*b* which can be manually lifted off to let the member 14 embrace the camera body 13**.

Figure 3:
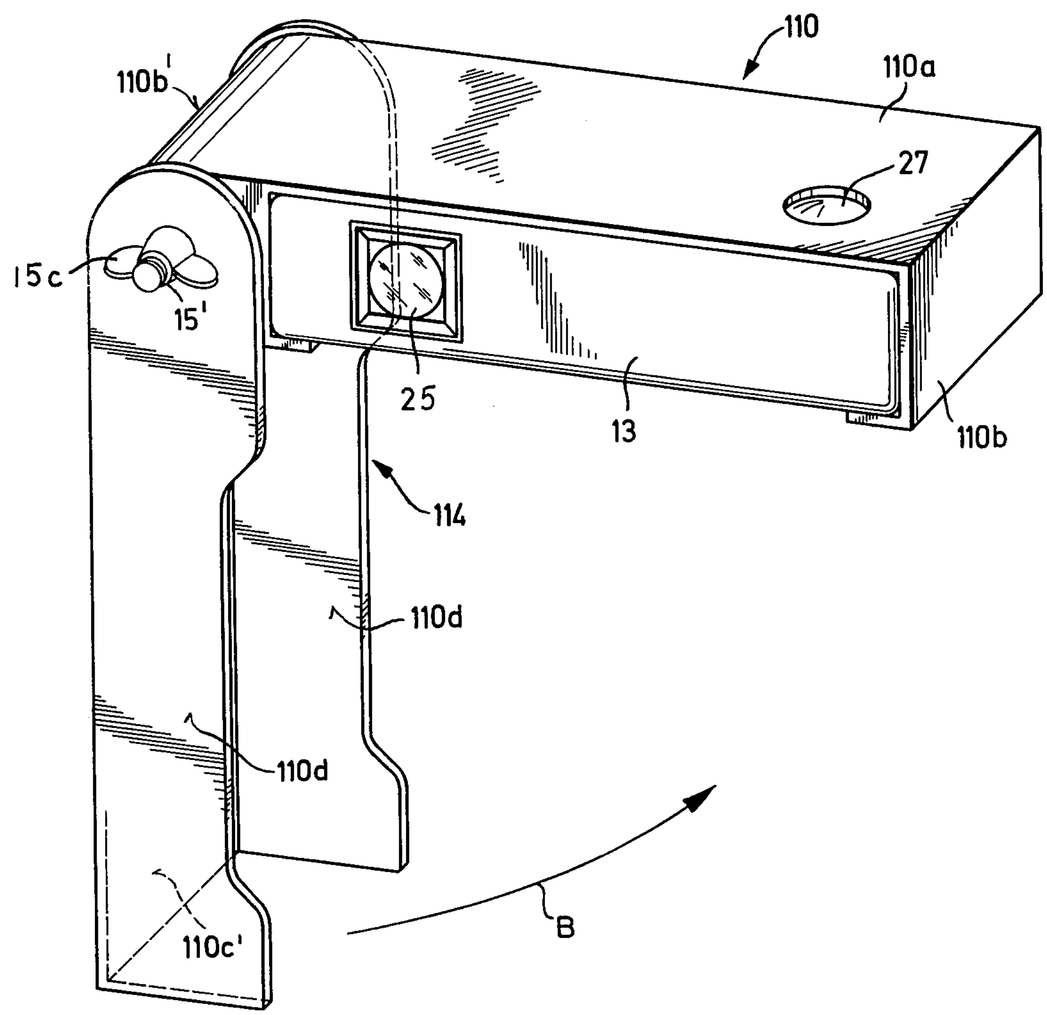
FIG. 3 is a view similar to FIG. 2, illustrating a modification.

In FIG. 3 I have shown an arrangement similar to that of FIG. 2 wherein, however, the bottom wall **110*c* of the body-engaging case portion 110 has been omitted and replaced by a back wall 110*c* of yoke member 114 which comes to rest against the underside of camera body 13 in the nonoperating position. Also, a pivot stud 15' has here been shown threaded and engaged by a wing nut 15*c* serving to hold the parts either in the illustrated operating position or in the alternate nonoperating position. Naturally, the wing nut 15*c* may also be substituted for the pawl-and-ratchet detent 15*a*, 15*b* of FIG. 2** or vice versa.

Figure 4:
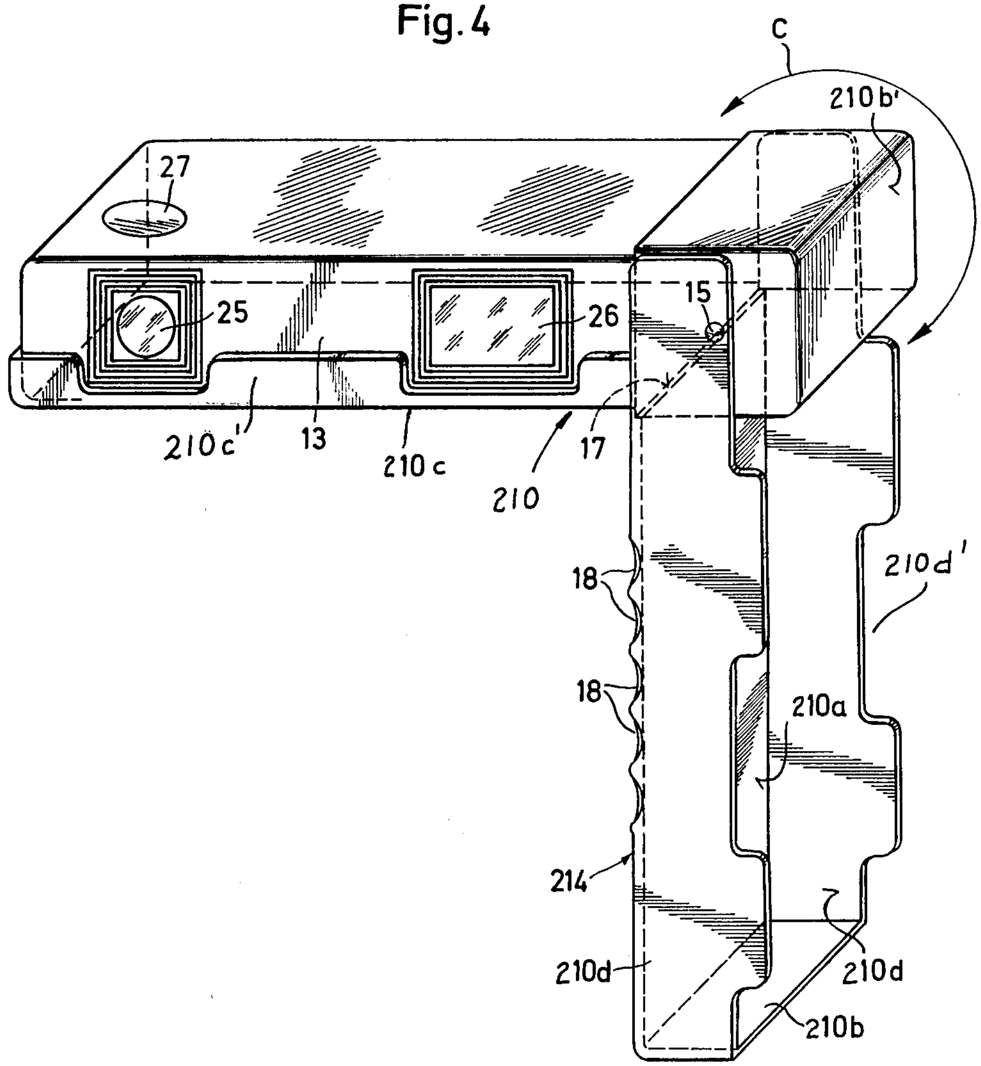
FIG. 4 is a perspective view of another photographic implement according to this invention.

The implement of FIG. 4 has a case whose body-engaging portion 210 includes a heel **210*b'* and a bottom wall 210*c* complementing a handle member 214 to a substantially closed shell when that member is swung from its illustrated operating position through an arc of 270° C (arrow C) into its alternate position enveloping the camera body 13. Handle member 214 is provided with finger-grip notches 18 which, of course, could also be present in other embodiments. This member has a back wall 210*a* forming the top of the closed shell, an end wall 210*b*, and two cheek plates 210*d* with recesses 210*d'* matingly receiving crenelations 210*c'* which rise from the edges of bottom wall 210*c*. Wall 210*a* terminates in a transverse edge 17, spanning the cheeks 210*d*, against which the camera body 13 comes to rest through the intermediary of bottom wall 210***c* in the illustrated operating position, thus obviating the need for special detent means as described with reference to FIGS. 2 and 3. Wall 210*a* thus has the triple function of reinforcing the yoke 214, forming an abutment for the bottom of camera body 13 in the illusttrated operating position and protecting the top of that body in the non-operating or closure position.

Figure 5:
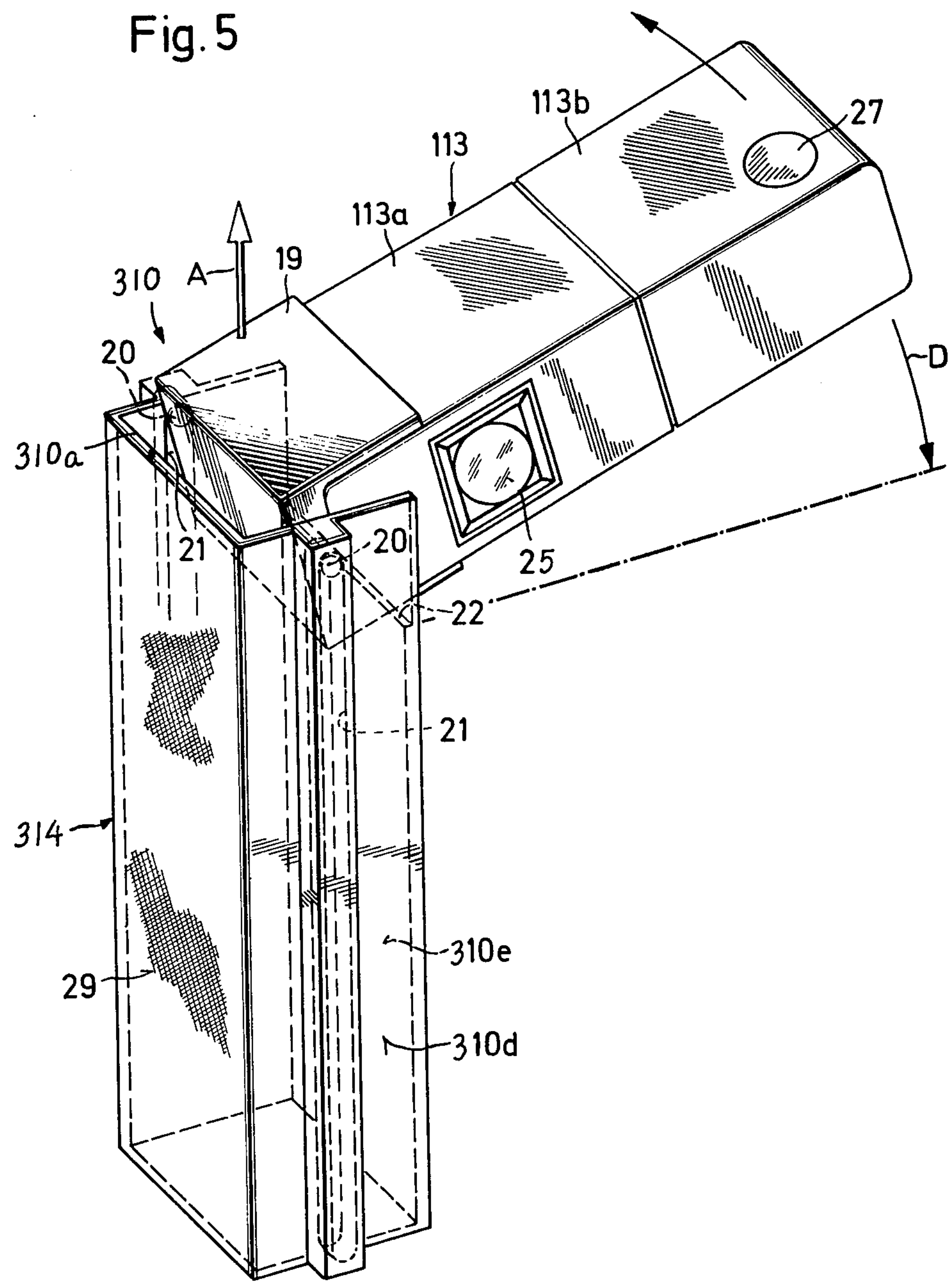
FIG. 5 shows, again in perspective view, a further embodiment.

In FIG. 5 I have shown a camera 113 whose body is split into two sections 113*a* and 113*b* which, in a manner known per se, must be slid apart to perform a film-transport stroke. Body section 113*a* is engaged by a bracket or heel 19 provided with pivot studs 20 which are slidably guided in a pair of longitudinal tracks 21 on cheek plates 310*d* of a handle member 314 which together with bracket 19 constitutes a protective case 310. Normally, that body is fully encased in member 314 as the studs are slid to the lower ends of their guide tracks 21; when the camera is to be operated, it is raised together with bracket 19 in the direction of arrow A and is then swung clockwise, as indicated by an arrow D, unitl the underside of the bracket comes to rest on a transverse edge 22 of a bracing plate 310*e* spanning the cheek plates 310*d* to form a back wall for the handle member. The opposite motion, with endwise insertion of the camera body into the handle 314, serves for the retraction of the camera into that handle whose basic yoke shape is complemented by walls 310*a* and 310*c* to a box. In the nonoperating position of camera 113, bracket 19 closes the top end of that box.

FIG. 5 also shows the front wall 310*a* and the cheeks 310*d* of handle 314 as clad with a fabric layer 29 representative of any of the aforementioned anti-slippage materials. Layer 29 is carried on a substantially rigid core constituting the several walls referred to; if desired, that layer can also extend over the back plate 310*e*. Naturally, similar sheaths or layers can also be provided on the handles shown in other Figures.

Figure 6:
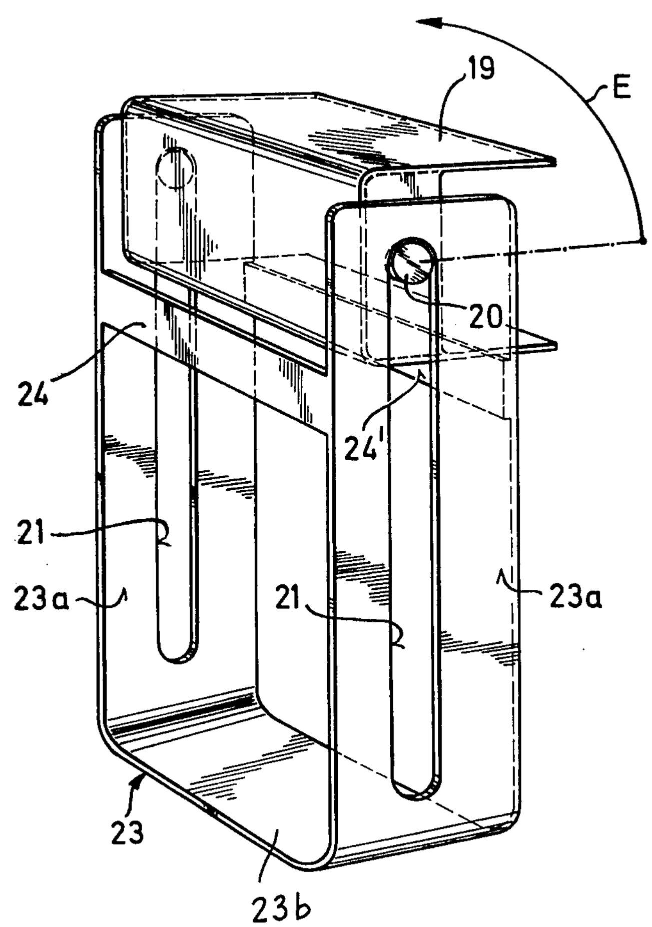
FIG. 6 is a perspective representation of a modified case for the implement of FIG. 5.

In FIG. 6, finally, I have illustrated a yoke-shaped handle 23 representing a modification of the handle 314 of FIG. 5 and comprising cheek plates 23*a* interconnected by a bight 23*b*, these cheeks having slots 21 forming the aforedescribed guide tracks for studs 20 on bracket or heel 19. Cheek plates 23*a* are spanned by a pair of front and rear braces 24, 24' between which the bracket 19 with its camera body (not shown in this Figure) can pass when the bracket is swung through 90°, as indicated by an arrow E, preparatorily to retraction of the camera into its nonoperating position. Yoke 23, which may consist of metal, may again be clad with a non-slip layer or sheath as described in connection with FIG. 5. Rear brace 24' serves as an abutment for the bracket 19, and therefore also for the camera body, in the illustrated operating position.

I claim:

1. A photographic implement comprising:

a pocket camera having a flat, generally prismatic body with side faces provided with a photographic objective and a viewfinder alongside each other;

a protective case having a pair of cheek plates parallel to said side faces having formed thereon a pair of guide tracks, said body being provided on an end thereof with pivot studs transverse to said side faces engaging in said tracks for facilitating relative displacement of said body and said case in a composite motion with endwise insertion of said body into said case to establish a nonoperating position, said cheek plates bracketing said body and obstructing said objective and said viewfinder by respectively overlying said side faces in said nonoperating position; and holding means on said case engageable with said body for arresting said case in an operating position with said cheek plates extending substantially perpendicularly to said body whereby said case is usable as a rigid handgrip for said camera.

2. A photographic implement as defined in claim 1 wherein said holding means comprises a transverse brace spanning said cheek plates and forming an abutment for said body in said operating position.

3. A photographic implement as defined in claim 2 wherein said camera is provided with a heel embracing said end of said body and coming to rest on said abutment in said operating position, said pivot studs being fixed to said heel.

4. A photographic implement comprising:

a pocket camera having a flat, elongate body with a top, a bottom and a pair of side faces perpendicular thereto, said side faces being provided with a photographic objective and a viewfinder alongside each other;

a protective case pivotally connected with said camera at an end of said body for swinging about an axis perpendicular to said side faces between a nonoperating position and an operating position, said case including a pair of parallel cheek plates perpendicular to said axis, said cheek plates extending in said nonoperating position in the longitudinal direction of said body and obstructing said objective and said viewfinder by respectively overlying said side faces while bracketing said body over substantially the full length thereof; and abutment means on said case rigid with said cheek plates including a stop edge parallel to said axis supporting said bottom in said operating position with said cheek plates extending substantially perpendicularly to said bottom whereby said case is usable as a rigid handgrip for said camera.

5. A photographic implement as defined in claim 4 wherein said body and said case have a swing range of substantially 270° between said operating and nonoperating positions, said top entering between said cheek plates and confronting said abutment means in said nonoperating position.

6. A photographic implement as defined in claim 5 wherein said abutment means comprises a back wall of said case and wherein said bottom is underlain by a wall member complementing said cheek plates and said back wall to a substantially closed shell in said nonoperating position.

7. A photographic implement as defined in claim 6 wherein said case further includes an end wall perpendicular to said back wall spanning said cheek plates.

8. A photographic implement as defined in claim 4 wherein said camera is provided with a heel embracing said end of said body and carrying a pair of pivot studs in line with said axis engaging said case, said heel coming to rest on said stop edge in said operating position.

9. A photographic implement as defined in claim 4 wherein said cheek plates form a pair of guide tracks, said body being provided with pivot studs engaging in said tracks for facilitating relative displacement of said body and said case in a composite motion with endwise insertion of said body into said case to establish said nonoperating position.

10. A photographic implement as defined in claim 8 wherein said case and said heel are mutually complementary segments of a shell enveloping said body in said nonoperating position.

11. A photographic implement as defined in claim 4 wherein said case has at least a surface layer of nonmetallic anti-slippage material disposed for engagement by the hand of a user.

12. A photographic implement as defined in claim 11 wherein said surface layer is part of a flexible sheath, enveloping said cheek plates.

13. A photographic implement as defined in claim 8 wherein said cheek plates form a pair of guide tracks engaged by said pivot studs for facilitating relative displacement of said heel and said case in a composite motion with endwide insertion of said body into said case to establish said nonoperating position.

* * * * *